United States Patent Office 3,274,260
Patented Sept. 20, 1966

3,274,260
METHOD FOR PRODUCING MONOALKYL ETHERS OF DIHYDRIC PHENOLS
Joseph Levy, Paramus, N.J., and Alvin Friedman, New York, N.Y., assignors to Universal Oil Products Company, Des Plaines, Ill., a corporation of Delaware
No Drawing. Filed Aug. 31, 1964, Ser. No. 393,419
3 Claims. (Cl. 260—613)

This application is a continuation-in-part of copending application Serial No. 76,154, filed December 16, 1960, now abandoned.

This invention relates to an improved method for producing monoalkyl ethers of unsubstituted dihydric phenols by the alkylation of a single hydroxyl group of such a phenol.

The synthesis of alkyl aryl ethers is generally accomplished by reacting a phenol with an alkylating agent such as an alkyl halide, sulfate, toluene sulfonate or the like, in the presence of an aqueous solution of an alkali metal hydroxide such as sodium or potassium hydroxide. The reaction proceeds with the initial formation of an alkali phenolate which in turn reacts with the alkylating agent to produce the alkyl ether of the phenol.

While this general procedure gives excellent results with monohydric phenols, many difficulties are encountered in attempting to effect the alkylation of a single hydroxyl group of an unsubstituted dihydric phenol, such as hydroquinone, resorcinol or catechol, to produce a monoalkyl ether thereof. Selective conversion of a dihydric phenol to its monoalkyl ether does not readily take place since the monoether formed in the reaction reacts further to produce a dialkyl ether with the result that a mixture of reaction products is obtained comprising unreacted dihydric phenol, the desired monoalkyl ether of the phenol and the undesired dialkyl ether of the phenol which are tedious and costly to separate.

The unsubstituted dihydric phenols vary in reactivity and of the three dihydric phenols, namely hydroquinone, resorcinol and catechol, the most difficult to alkylate to form the monoalkyl ether thereof in satisfactory yield is hydroquinone. The relative position of the two hydroxyl groups on the aromatic ring appears to affect the selectivity of the reaction. Thus, the highest yield of a monoalkyl ether is generally most readily obtained with catechol having the hydroxyl groups in ortho position and the lowest with hydroquinone having the hydroxyl groups in para position. Conversely, the highest proportion of the undesired dialkyl ether produced concomitantly in the reaction is generally obtained with hydroquinone and the lowest with catechol. As previously mentioned, it is difficult to separate the monoether from the mixture of reaction products obtained; for example, direct distillation of the mixture is usually unsatisfactory and prior extraction with aqueous alkali followed by acidification is often required. This product separation aspect of the reaction substantially affects the successful obtainment of monoalkyl ethers of dihydric phenols, in particular the monoalkyl ethers of hydroquinone, in an economically feasible manner. The ratio of the yield of the monoether to the yield of the diether obtained in the reaction also affects the ease of separation and, accordingly, becomes an important factor in evaluating the success of the monoalkylation of dihydric phenols. A high ratio of monoalkyl ether to dialkyl ether is, of course, desirable.

As described by Brederick, Hennig and Rau (Ber., 86, 1085, and German Patent No. 874,445) the monoalkylation of dihydric phenols may be carried out in a two-phase system in the presence of an inert, water immiscible solvent and at relatively low temperatures of about 30° to 60° C. and preferably at about 40° C. for best results. The solvent is reported to function by removing the monoether produced from the aqueous phase of the reaction mixture so as to minimize further reaction thereof with the alkylating agent to form the diether. However, the results obtained with different solvents vary greatly. Thus, for example, when benzene is used as the solvent in the monomethylation of hydroquinone with dimethyl sulfate according to the procedure of Brederick about 64 percent of the desired monomethyl ether is obtained while 25 percent of the diether is produced with the yield ratio of the monoether to the diether being about 2.5 to 1 and when trichloroethylene is used as the solvent, 63 percent of the monoether and 35 percent of the diether are obtained with a yield ratio of less than 2 to 1. In contrast to these solvents, however, better yields and ratios of the monoether to the diether are obtained when using nitrobenzene or anisole as the solvent with yields as high as 75 and 83 percent and ratios of about 15 to 1 and about 14 to 1 being obtained, respectively.

While the yields and ratios of yields obtained with solvents such as nitrobenzene and anisole are excellent there are, however, serious limitations in the use of such solvents. For example, separation of the desired monoalkylethers from these relatively high boiling solvents requires tedious extraction procedures and thus detracts from the economical obtainment of the desired product. Moreover, other properties of these solvents also detract from their suitability such as the relatively high cost of anisole and the strong oxidizing properties of nitrobenzene which renders its use under alkaline conditions in the presence of an easily oxidized material such as hydroquinone potentially hazardous.

The temperatures which are used for this reaction in combination with solvents such as nitrobenzene and anisole according to the procedure of Brederick are generally low in the range of about 30° to 60° C. and preferably about 40° C. for best results because as the temperature increases, the yield of the desired monoalkyl ether obtained in the reaction decreases. Moreover, these relatively low temperatures are also used in order to prevent excessive saponification of the alkylating agent used, for example, a dialkyl sulfate.

The serious problems involved in producing monoalkyl ethers of dihydric phenols are well known and many procedures have heretofore been suggested for avoiding these problems. One of these procedures is the process described in United States Patent No. 2,781,404 which is directed to the preparation of ortho-alkyl-p-alkoxyl-phenols. In this process, the problems involved in the production of a monoalkyl ether of hydroquinone are substantially avoided through utilization of a steric hindrance effect by first introducing a bulky alkyl group into the aromatic ring which substantially blocks the adjacent hydroxyl group during subsequent etherification of the substituted hydroquinone to obtain the desired compound. This two-step procedure of first alkylating the aromatic ring to substantially hinder etherification of the adjacent hydroxyl group followed by selectively etherfying the non-hindered hydroxyl group thus avoids the serious problems involved in obtaining high yields of monoethers of unsubstituted dihydric phenols without concomitantly producing large quantities of the undesired diethers and accordingly does not require and does not utilize a two-phase reaction system of an aqueous phase and an inert, water immiscible solvent.

It has now been discovered that high conversions and yields of monoalkyl ethers of dihydric phenols, in particular of hydroquinone of about 78 and 85 percent, respectively, with ratios of the monoether to the diether as high as 10 to 1, can be achieved in the reaction of unsubstituted dihydric phenols with an alkylating agent in the presence of aqueous alkali metal hydroxide by using a two-phase reaction system which does not require highly disadvantageous solvents such as anisole or nitrobenzene.

This highly desirable result is achieved according to this invention by the combination of carrying out the reaction at elevated temperatures of from about 65° to about 100° C., preferably at the refluxing temperature of the particular solvent utilized; by using relatively large amounts of an inert, water immiscible solvent within the range of from about 4 to 8, preferably about 6 to 8, parts by weight of solvent per part of dihydric phenol; and by regulating the formation of the alkali phenolate in the reaction mixture.

The high yields obtained simultaneously with desirable ratios of monoethers to diethers in the process of this invention which is conducted at substantially elevated temperatures are quite surprising in view of the fact that it is well known that as the temperature of the reaction is increased there is a corresponding decrease in the yield of the desired monoether. It is believed, however, that the highly desirable effects of this invention result from the aforesaid combination of the three essential conditions of the process; namely, relatively elevated temperature, the use of an inert, water immiscible solvent in a relatively high ratio, and by regulating the formation of the alkali phenolate during the reaction.

Accordingly, the principal object of the present invention is to provide an improved method for producing monoalkyl ethers of unsubstituted dihydric phenols in high yield and with desirable high proportions of monoethers to diethers in the reaction product. A further object of the invention is to provide a method for the production of monoalkyl ethers of unsubstituted dihydric phenols which permits ready separation of the monoalkyl ether from the reaction product.

A specific object of the invention is to provide a method for the production of monoalkyl ethers of unsubstituted dihydric phenols wherein an alkylating agent is brought into contact with an unsubstituted dihydric phenol in the presence of an aqueous solution of an alkali metal hydroxide and a relatively large amount of an inert, water immiscible solvent at a temperature of from about 65° to 100° C. or higher.

In practicing the present invention, it is possible to obtain high yields of monoalkyl ethers of unsubstituted dihydric phenols such as hydroxyanisole, resorcinol monomethyl ether, quaiacol, resorcinol monoethyl ether hydroquinone monoethyl ether, catechol monoethyl ether or the like by procedures which are relatively simple and economical to carry out.

As indicated above an essential feature of the process of this invention is that the inert, water immiscible solvent be used in a weight ratio of from about 4 to 8, more preferably about 6 to 8 times the weight of the dihydric phenol present. Utilization of such high-solvent ratios is necessary because at the relatively elevated reaction temperatures used according to this invention of from about 65° C. up to about 100° C., or preferably at reflux, the yield of the monoalkyl ether decreases as the ratio of solvent is lowered below such levels.

The solvents which may be used in the process of this invention must be inert and water immiscible and should have a boiling point substantially different from that of the monoether being prepared. Included within the solvents having these requirements are such solvents as benzene; lower alkyl substituted benzenes, for example, toluene or xylene; or halogenated hydrocarbons, for example, ethylene dichloride, trichloroethylene, or chlorobenzene. Of the many suitable solvents, benzene is preferred and this suitability of benzene is quite surprising in view of the fact that it was found to be relatively ineffective when used in lower ratios and at lower temperatures in the procedures of the prior art.

Among the alkylating agents employed, substantially any lower alkyl halide, sulfate or toluene sulfonate may be used. The preferred agents are dimethyl sulfate or diethyl sulfate when methyl or ethyl ethers, respectively, are desired. Other alkylating agents such as ethyl chloride, propyl chloride, butyl chloride, butyl bromide, and butyl toluene sulfonate or the like may be used. Although an excess of the alkylating agent may generally be used, highly satisfactory results are unexpectedly obtained with equimolar quantities.

The reaction must be conducted at relatively elevated temperatures in order to achieve the desired effects and these temperatures are above about 65° C. up to about 100° C. and more preferably at refluxing temperatures, which, of course, will depend in part upon the boiling point of the solvent used. When using benzene as the solvent, the preferred temperature range is from about 70° to 85° C.

The formation of the alkali phenolate in the reaction mixture, the control of which is an essential feature of this invention, is regulated by gradual addition of the alkali metal hydroxide so that there will always be a continuous, but limited amount, present at any time during the reaction. By thus adding, gradually, the alkali metal hydroxide in the presence of a relatively large amount of an immiscible solvent the monoalkali salt of the dihydric phenol will be mostly formed in the aqueous phase while only a small amount of the alkali salt of the monoalkyl ether of the dihydric phenol will exist in the mixture and hence the production of the diether will be minimized.

The reaction may be effected by charging the dihydric phenol, the solvent and the alkylating agent to a reaction vessel and then gradually adding the alkali metal hydroxide in the form of an aqueous solution. This addition is preferably made at reflux temperature and the time of addition may be varied from about one-half hour to about four hours, and preferably from about one to two hours. The addition time may be further prolonged beyond two hours, but no substantial advantage is gained thereby.

While the alkylating agent may be added to the mixture prior to starting the alkali addition, further substantial improvements in yields and ratios of yields are obtained by also regulating the addition of the alkylating agent to the mixture. This is readily accomplished by simultaneously adding both the alkylating agent and the alkali metal hydroxide to the reaction mixture slowly, preferably at reflux, with the addition of the alkali slightly preceding the alkylating agent. This has the combined effect of limiting the formation of the alkali salt of the monoalkyl ether and also limiting the amount of alkylating agent available to react with this salt, thus lessening formation of diethers. Moreover, hydrolysis of the alkylating agent is substantially lessened thereby, thus permitting use of stoichiometric quantities.

The alkali metal hydroxide is preferably used as an aqueous solution because of the ease of handling and as a way of adding the necessary water to form the aqueous phase of the two-phase system. Included within the group of preferred alkali metal hydroxides are the hydroxides of lithium, potassium or sodium. Preferably, concentrated solutions of the alkali metal hydroxide are used such as a 50 percent aqueous solution. In order to facilitate stirring and as an additional means of supplying water for the aqueous phase, a limited amount of water may be added to the reaction mixture before the addition of the alkali solution. Also, if desired, water may be removed from the reaction mixture as the reaction proceeds by refluxing and separating water from the azeotropic distillate before return of the solvent to the reaction vessel.

In order to illustrate typical procedures in accordance with this invention and to contrast these procedures with those of the prior art, the following examples are cited:

Example I

This example is included to demonstrate the varying reactivity of the three unsubstituted dihydric phenols, namely hydroquinone, resorcinol and catechol and to indicate that under similar reaction conditions hydroquinone is the most difficult to selectively convert to its monoalkyl ether and catechol the least difficult. Obviously, therefore, any comparison of yields of monoether and yield ratios of monoether to diether can only be made between identical unsubstituted dihydric phenols.

The following data is taken from Ber. 86, 1085, in particular pages 1086 and 1087, and represent the results of reactions conducted under similar conditions. In these reactions, 30 percent molar excess of dimethyl sulfate was employed and the reactions were all carried out at about 40° C. with the addition of alkali conducted in about 2 to 2.5 hours so that the pH of the reaction mixture was maintained at about 8 to 9.

| Solvent | Methyl Ether of Hydroquinone | | Methyl Ether of Resorcinol | | Methyl Ether of Catechol | |
|---|---|---|---|---|---|---|
| | Percent Mono- | Percent Di- | Percent Mono- | Percent Di- | Percent Mono- | Percent Di- |
| Trichloroethylene | 63 | 35 | 68 | 22 | 67 | 10 |
| Benzene | 64 | 25 | 70 | 20 | 75 | 10 |
| Nitrobenzene | 75 | 5 | 80 | 5 | 90 | 3 |
| Anisole | 83 | 6 | 84 | ---------- | 82 | 3 |

Example II

The monomethyl ether of hydroquinone (hydroxyanisole) was produced according to the process of this invention by charging 846 grams of hydroquinone (7.7 moles), 6150 grams of benzene and 1134 grams of dimethyl sulfate (9 moles; 17% excess) into a reaction flask fitted with a water trap. The mixture was heated to reflux and at about 85° C., 720 grams of 50 percent aqueous sodium hydroxide were gradually added over a period of about one hour. The mixture was then refluxed for an additional one-half hour. The reaction temperature varied from about 75° to 85° C. during the entire reaction period and about 82 grams of water were removed in the water trap. At the end of the reaction, the reaction mixture was cooled and then diluted with 1000 grams of water to dissolve the inorganic salts. The top oil layer (7070 grams) was separated and washed with another 1000 grams of water. Isolation of the products gave about 78 percent of theory of hydroxyanisole and about 15 percent of theory of hydroquinone dimethyl ether with the ratio of the monoether to the diether being 5.2 or about 5 to 1. In this experiment, no attempt was made to recover any unreacted hydroquinone.

Example III

This example is included to demonstrate the further improved results achieved in the process of this invention by gradually adding the alkylating agent to the reaction mixture along with the alkali metal hydroxide solution and can be contrasted with Example II above to observe that while only a stoichiometric amount of the alkylating agent was used, the ratio of the monoether to the diether is doubled.

The monomethyl ether of hydroquinone (hydroxyanisole) was produced according to the process of this invention by charging 660 grams of hydroquinone (6 moles), 4800 grams of benzene, and 300 grams of water into a three necked flask fitted with a reflux condenser, stirrer, and two addition funnels. Then 480 grams of 50 percent aqueous sodium hydroxide (6 moles), and 756 grams dimethyl sulfate (6 moles; an equimolar quantity) were gradually added simultaneously at reflux (70°–75° C.) during a period of about one hour keeping the alkali slightly ahead of the dimethyl sulfate. The addition was made under a nitrogen atmosphere to minimize air oxidation of the hydroquinine but this is not essential to the success of the reaction. The mixture was refluxed for another one-half hour and then acidified to litmus with about 12 grams of acetic acid. The top oil layer was separated from the aqueous phase, washed with about 600 grams of a five percent sodium sulfate solution and distilled. After recovering the benzene, there was obtained a 122 gram head fraction distilling from 109°–140° C. at 20 mm., followed by 525 grams of hydroxyanisole distilling at 141° C. at 20 mm. The head fraction consisted of a mixture of hydroquinone dimethyl ether and hydroxyanisole from which 53 grams hydroxyanisole were recovered by extraction with aqueous sodium hydroxide followed by acidification. The total amount of hydroxyanisole recovered was 578.5 grams (4.66 moles) which represents about a 78 percent conversion calculated on charged hydroquinone. From the non-alkali soluble portion of the head fraction was obtained 64 grams (0.46 mole) hydroquinone dimethyl ether which represents 7.7% conversion on charged hydroquinone. The combined aqueous layers were then treated for recovery of unreacted hydroquinone by extraction with methyl isobutyl ketone. After evaporation of the solvent, there was obtained 52 grams of hydroquinone (0.47 mole) analyzing 96 percent. Accordingly, the yields of hydroxyanisole and hydroquinone dimethyl ether based on consumed hydroquinone were 84.5 percent and 8.3 percent, respectively, with the yield ratio of the monoether to the diether being 10.2 or about 10 to 1.

Example IV

The procedure of Example III was repeated, except that ethylene dichloride was used instead of benzene in the same relative amount. There were obtained about the same yield of hydroxyanisole and about the same yield ratio of hydroxyanisole to hydroquinone dimethyl ether.

Example V

The procedure of Example III was repeated, except that resorcinol was used instead of hydroquinone. There were obtained resorcinol monomethyl and dimethyl ethers in yields of 80 percent and 3.8 percent of theory, respectively, with the yield ratio of the monoether to the diether being 21.1 or 21 to 1.

Example VI

The procedure of Example III was repeated using catechol instead of hydroquinone. There were obtained quaiacol and catechol dimethyl ether in yields of 86.5 percent and 2.9 percent of theory, respectively, with the ratio of the monoether to the diether being 29.8 or about 30 to 1.

Example VII

The procedure of Example VI was repeated except that diethyl sulfate was used instead of dimethyl sulfate. A highly selective reaction was obtained, the product consisting of a mixture about 13.5 parts catecol monoethyl ether per part of diethyl ether. This represents the formation of 16.8 moles of the monoether for each mole of the diether with the yield ratio of the monoether to the diether being about 16.8 to 1.

Example VIII

This example is included to demonstrate the unsatisfactory results achieved when conducting the alkylation at the elevated temperatures used in the process of this invention with solvent ratios below those required by this invention.

The monomethylation of hydroquinone was effected in a fashion similar to Example II, except that the ratio of benzene was only 2 parts by weight per part of hydroquinone and that 1.3 moles (30 percent excess) of dimethyl sulfate were employed per mole of hydroquinone. The reaction proceeded with extensive saponification of the dimethyl sulfate as indicated by the recovery of 67 percent of the charged hydroquinone. The yield of hydroxyanisole obtained was 25 percent of theory.

*Example IX*

The following table summarizes the results recited in Examples II to VI illustrating the process of this invention and contrasts them with the results obtained by the procedure of Brederick as reported in Ber. 86, page 1085. The data in this table clearly demonstrate the improved yields and yield ratios obtained, especially in the alkylation of hydroquinone by the procedure of this invention which does not require the use of such highly undesirable solvents such as nitrobenzene or anisole.

| Source | Solvent | Methyl Ether of Hydroquinone | | | Methyl Ether of Resorcinol | | | Methyl Ether of Catechol | | |
|---|---|---|---|---|---|---|---|---|---|---|
| | | Percent Mono Yield | Percent Di-Yield | Ratio Mono-Di Yield | Percent Mono Yield | Percent Di-Yield | Ratio Mono-Di Yield | Percent Mono Yield | Percent Di-Yield | Ratio Mono-Di Yield |
| Brederick | Trichloro ethylene | 63 | 35 | 1.8 | 68 | 22 | 3.1 | 67 | 10 | 6.7 |
| | Nitrobenzene | 75 | 5 | 15 | 80 | 5 | 16 | 90 | 3 | 30 |
| | Anisole | 83 | 6 | 13.8 | 84 | | >84 | 82 | 3 | 27.3 |
| | Benzene | 64 | 25 | 2.82 | 70 | 20 | 3.5 | 90 | 3 | 30 |
| Example II | Benzene | 78 | 15 | 5.2 | | | | | | |
| Example III | do | [1]78 | 7.7 | 10.2 | | | | | | |
| Example IV | Ethylene dichloride | [1]78 | 7.7 | 10.2 | | | | | | |
| Example V | Benzene | | | | 80 | 3.8 | 21.1 | | | |
| Example VI | do | | | | | | | 86.5 | 2.9 | 29.8 |

[1] Calculated on consumed hydroquinone the yields of mono and di-ether are 84.5% and 8.3%, respectively. The yield ratio is unaltered.

The foregoing examples indicate that the process of the invention is general in character and may be used to obtain high yields of various monoalkyl ethers of unsubstituted dihydric phenols. Moreover, the process of this invention is, of course, capable of numerous variations and modifications and, accordingly, it should be understood that the specific examples cited above are intended to be illustrative only and are not intended to limit the scope of this invention.

We claim as our invention:

1. A process for the production of the monomethyl ether of hydroquinone which comprises reacting hydroquinone with dimethyl sulfate at a temperature of from about 65° C. to about 100° C. in admixture with from about 4 to 8 parts by weight per part of hydroquinone of an inert, water-immiscible solvent selected from the group consisting of benzene, lower alkyl substituted benzenes and halogenated hydrocarbons while gradually adding to the reaction mixture an aqueous alkali metal hydroxide solution, and separating the resultant hydroquinone monomethyl ether from the reaction mixture.

2. The process of claim 1 further characterized in that the hydroquinone and dimethyl sulfate are reacted at the refluxing temperature of said solvent.

3. A process for the production of the monomethyl ether of hydroquinone which comprises reacting hydroquinone with dimethyl sulfate at a temperature of from about 65° C. to about 100° C. in admixture with benzene solvent in an amount of from about 6 to 8 parts by weight per part of hydroquinone while gradually adding to the reaction mixture an aqueous alkali metal hydroxide solution over a period of from about one-half to four hours, and separating the resultant hydroquinone monomethyl ether from the reaction mixture.

References Cited by the Examiner

UNITED STATES PATENTS 2,781,404   2/1957   Rosenwald _____ 260—613
3,033,745   5/1962   Rosen _____ 260—613 X

FOREIGN PATENTS 874,445   4/1953   Germany.

OTHER REFERENCES

Klarman et al.: Jour. Amer. Chem. Soc., vol. 53 (1931) pages 3397–3407.

LEON ZITVER, *Primary Examiner.*

B. HELFIN, *Assistant Examiner.*